Dec. 7, 1954 H. T. DOUGHTY 2,696,237
TIRE LUG
Filed Jan. 13, 1950 2 Sheets-Sheet 1

INVENTOR
Hartwell T. Doughty
BY Robert M. Dunning
ATTORNEY

Dec. 7, 1954   H. T. DOUGHTY   2,696,237
TIRE LUG
Filed Jan. 13, 1950   2 Sheets—Sheet 2
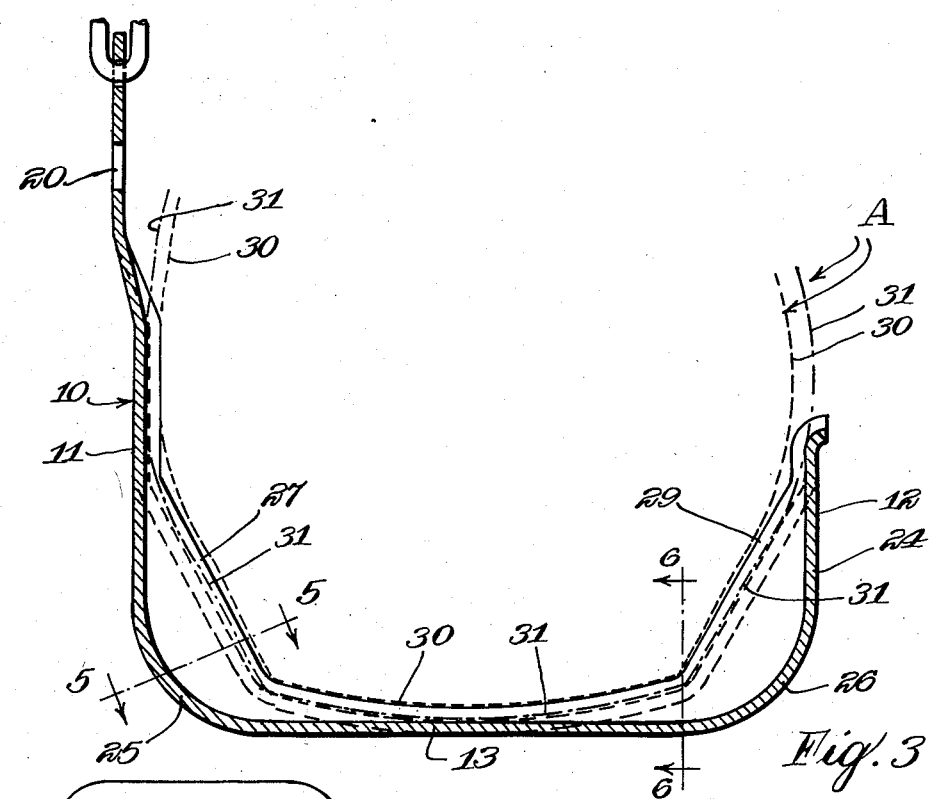
Fig. 3
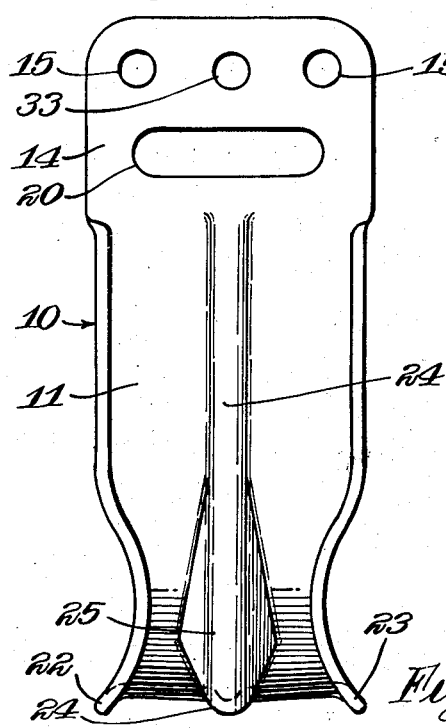
Fig. 4
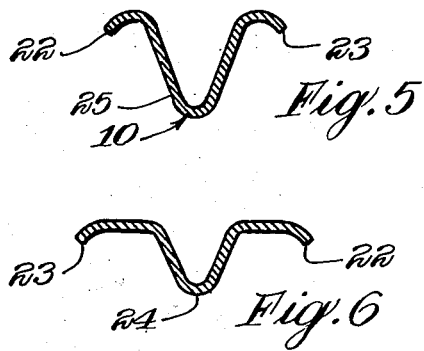
Fig. 5
Fig. 6
INVENTOR
Hartwell T. Doughty
BY Robert M. Dunning
ATTORNEY

United States Patent Office 2,696,237
Patented Dec. 7, 1954

2,696,237

TIRE LUG

Hartwell T. Doughty, St. Paul, Minn.

Application January 13, 1950, Serial No. 138,307

6 Claims. (Cl. 152—228)

My invention relates to an improvement in tire lug wherein it is desired to provide a device capable of providing traction for the wheel and also useful in the prevention of skidding of the wheel.

Various types of tire lugs have been produced to provide added traction to a wheel while passing through snow, mud, and the like. One of the biggest difficulties with such lugs lies in the difficulty usually experienced in applying the lugs. Another difficulty lies in holding the lugs in proper relation to the casing during rotation thereof. A third disadvantage with most such lugs lies in the fact that they are usually quite thick at the portion thereof extending over the tread of the tire so as to cause a very noticeable bump as the lugs pass between the tire casing and the ground.

An object of the present invention lies in the provision of a tire lug which may be attached in a simple manner and which is effectively held in place at all times. My lug also is usually relatively thin at the point thereof passing over the tread of the tire so that the tire need not be raised substantially as the lug passes between the tire casing and the ground.

A feature of the present invention lies in the provision of a tire lug of J-shaped form designed to hook over the tread of the tire and to be anchored by connecting the ends of the lugs together. As a result the process of attaching the lugs to the tires is greatly simplified and can be accomplished with a minimum of difficulty.

A further feature of the present invention lies in the manner in which the lugs are held in place at all times. My lugs are shaped to provide edge portions which are designed to substantially follow the contour of the tire casing. When each lug is not in contact with the ground, it is held in place by suitable connections with the remaining lugs. However, when the lug is in contact with the ground, the expanded portion of the tire expands into the outwardly projecting rib and acts to hold the lug from movement relative to the casing. In other wards, the weight of the vehicle upon the tire flattens the area of the tire in contact with the ground and as the lug engages the ground, this expansion takes place in such a manner that the tire will be expanded into the outwardly projecting rib, thereby preventing circumferential movement of the lug on the tire.

A further feature of the present invention lies in the general shape and form of the lug. The lug is preferably relatively flat along the ground engaging portion thereof and this ground engaging portion is substantially wider than the portion of the tire tread which normally engages the ground. By increasing this effective width of the lug, a pushing area is provided on the lug on either side of the tread which provides a "paddle wheel" action without increasing the thickness of the lug at the portion thereof extending over the ground engaging tread.

A further feature of the present invention lies in the provision of a J-shaped lug including a pair of side elements which extend along opposite sides of the tire casing in substantially parallel relation and a cross connecting element forming the base of the J designed to extend over the casing tread. The rounded connections between the side arms and the connecting base are of relatively small radius at the outwardly projecting rib so that a generally triangular space is provided at these points. The body of the lug on either side of the outwardly projecting rib follows the general contour of the casing. These generally triangular ribs provide a substantial pushing area on either side of the tire casing near the periphery thereof which greatly adds to the "paddle wheel" action of the lug without increasing the thickness of the lug portion extending over the tire tread.

These and other objects and novel features of my invention will be more clearly and fully set forth in the following specification and claims.

In the drawings forming a part of my specification:

Figure 3 is a cross sectional view centrally through the lug showing the construction thereof.

Figure 4 is a side elevational view of the lug.

Figure 5 is a cross sectional view, the position of the section being indicated by the line 5—5 of Figure 3.

Figure 6 is a sectional view through another portion of the lug, the position of the section being indicated by the line 6—6 of Figure 3.

Figure 1:
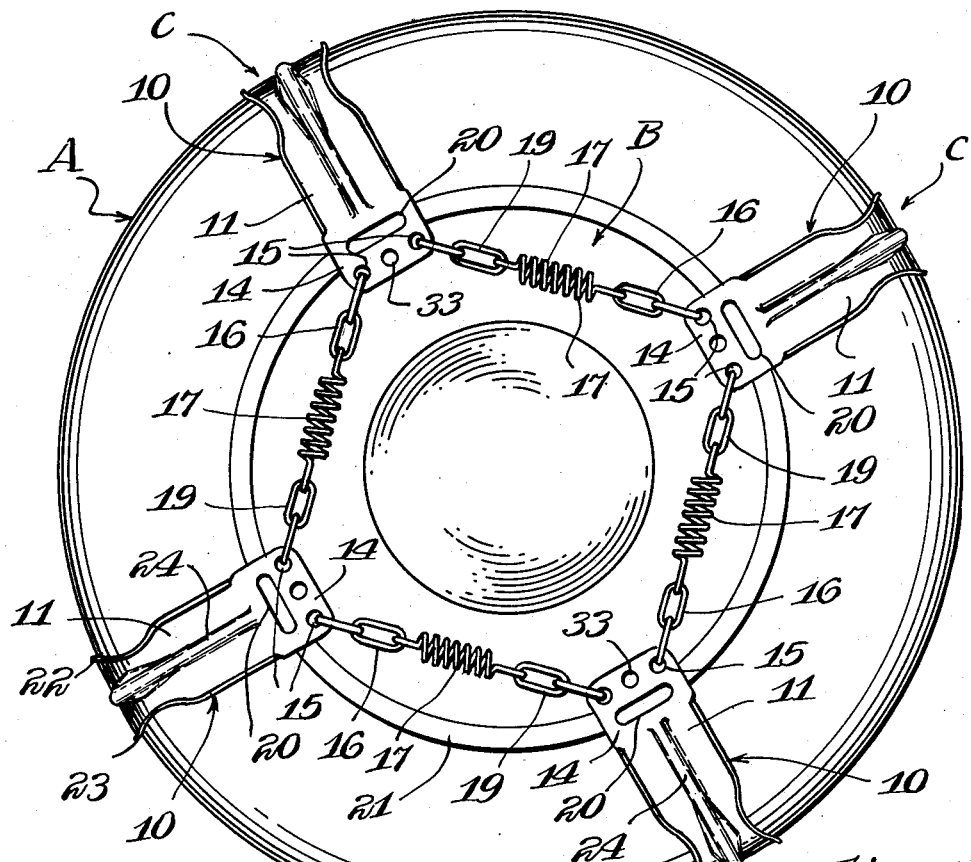
Figure 1 is a side elevational view of a vehicle wheel showing a series of lugs in place thereupon.

The tire casing is indicated in general by the letter A and is mounted upon a vehicle wheel B. The tire lug assembly is indicated in general by the letter C and in the form of construction illustrated comprises four connected lugs arranged in generally right angular relationship. The number of lugs may be changed if desired without changing the principles of the invention. For example, on extremely large tires it may be desirable to employ several more lugs of the type illustrated. The individual lugs are indicated in general by the numeral 10. Each lug is preferably formed of an elongated strip of material bent into J-shaped form as illustrated. Each lug includes a pair of opposite arms 11 and 12 which are designed to extend on opposite sides of the tire casing A. These arms 11 and 12 are connected by a cross connecting portion 13. The arm 11 is preferably somewhat longer than the arm 12 and is designed to extend over the outer surface of the tire casing for ease in attachment.

As illustrated in Figure 1 of the drawings, each of the arms 11 is provided with an attachment end 14 having a pair of spaced apertures 15 therethrough. The apertures 15 provide points for attachment with connecting elements which are designed to connect the spaced lugs. Each connecting element illustrated consists in a short length of chain 16, a spring 17, and a second short length of chain 19. The chains act to connect each spring with a pair of lugs 10 and each lug is connected to a pair of similar lugs 10 as best illustrated in Figure 1.

A slot 20 is preferably provided through the attachment end of each lug 10. This slot 20 is designed for accommodation of a screw driver, tire iron, or similar tool, and cooperates with such a tool in engaging and disengaging the lugs from the tire casing. The lugs may be attached in a simple manner by placing three of the lugs in angularly spaced relation about the periphery of a tire so that these three lugs are an angular distance of approximately ninety degrees apart. The fourth lug may then be attached to the tire by stretching the springs 17 until the unengaged lug may embrace a portion of the casing diametrically opposite the center lug of the three previously mounted lugs. In accomplishing this task a screw driver, tire tool, or other flat object may be inserted through the slot 20 of the unengaged lug and the end of the tool engaged against the tire rim 21 and providing a prying action to attach the remaining lug.

The shape of the lug may best be noted from an examination of the drawings. The lugs are provided with outwardly turned side edges or side flanges 22 and 23 which extend throughout the length of the lug, with the exception of the attaching ends 14 thereof. The lugs are also provided with an outwardly projecting rib 24 intermediate the side edges of the lug. This rib 24 is of varying depth at various portions of the lug. For example the rib 24 projects substantially beyond the periphery of the lug body at the juncture points 25 and 26 between the arms 11 and 12 and the connecting base 13. The body of the lug inclines inwardly and downwardly as indicated at 27 and 29 respectively so as to substantially fit the outer curvature of the tire casing A in its normal position, as indicated by the dotted outline 30. However, the rib 24 bulges outwardly at the points of connection and is rounded at the juncture between the arms and the connecting portion with a curvature of relatively small radius.

In Figure 4 of the drawings, it will be noted that the outwardly projecting rib 24 is relatively shallow along the connecting portion 13 and projects from the body of the lug a distance substantially equal to the flanges 22 and 23. However, an examination of Figures 5 and 6 of the drawings will clearly indicate that the depth of projection of the rib sharply increases at the points of juncture between the arms 11 and 12 and the connecting member 13.

The lug C thus provides an effective amount of paddle wheel effect with a minimum amount of thickness at the point which the lug extends over the tire tread. An examination of Figure 3 will indicate generally triangular areas on either side of the tire tread which are formed by the projecting ribs of the lug and which effectively increase the pushing area of the lug. As a result the lug is extremely effective in preventing slippage between the wheel and the ground or snow through which the wheel is travelling without providing a thick enough tread engaging portion to cause discomfort to the riders of the vehicle.

It will also be noted that as the tire expands toward the position indicated in broken line at 31 in Figure 3 of the drawings, the portion of the casing enclosed within the lug between the side edges thereof is permitted to expand into the outwardly projecting rib, thereby causing a definite engagement between the casing and the lug and preventing relative slippage therebetween. This fact is of importance as the lug is most likely to slip excessively when in engagement with the ground. By expanding the tire casing into a portion of the lug as the tire expands through contact with the ground, relative slippage between the lug and the casing may be effectively prevented.

Figure 2:
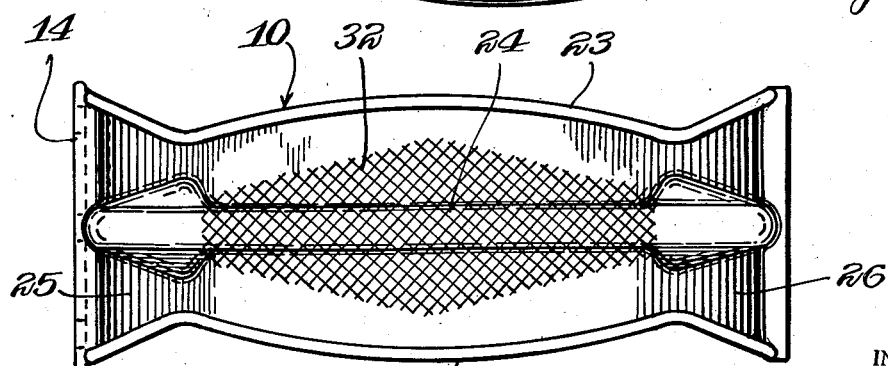
Figure 2 is a bottom plan view of the lugs illustrated in Figure 1, this view showing the base of the lug as well as the shape of the sides thereof.

In Figure 2 of the drawings I disclose the fact that the under surface of the connecting member 13 may be provided with a roughened surface or a series of teeth indicated at 32. These teeth may be cut into the body of the lug to proper depth to assist in preventing skidding of the wheel. The lug itself might alternately be formed of material resistant to slippage on a smooth surface. For example, carborundum or other extremely hard particles may be provided in the material of the lug which provide a relatively non-slipping surface. If preferred, a plate of material of this type may be supported upon the undersurface of the lug C to more effectively prevent slippage. The lug may either be cast of proper material, be formed of a flat sheet of material, or may be otherwise produced. However, as steel incorporating particles of carborundum, or similar non-skidding elements, are more easily formed, as produced at the present time, it is probably most readily possible to cast the lugs of such material, or else to add to the lugs covering plates of such material, particularly along the bottom surface thereof.

I have found that my chains are easy to apply and remove, and that they provide an effective pushing area or paddle wheel effect without excessive thickness over the tire tread. My lugs provide a positive action on ice or other slippery surfaces and at the same time do not roll or twist in the manner of the cross chains of a set of tire chains. The lugs also have the advantage of not breaking easily as in the case of tire chains and they cause less wear upon the tires as there are no sharp edges in contact with the casing as in the case of tire chains. The lugs also cause less wear upon pavements as the height of the lugs outside of the tire tread is less. This also serves to provide smoother riding. The design permits considerable wear with little decrease in effectiveness, resulting in longer life. The lugs provide more effective skidding control and increased efficiency with no increase in cost.

The attaching end 14 of each lug is preferably provided with a center hole 33 positioned between the other holes 15. This center hole 33 may be used to tighten the connecting chains as the tire tread becomes worn. By attaching the chain sections 16 and 19 in the center hole 14, or in attaching either end of the chain in this center hole, the effective length of the connecting member is elongated, thereby either increasing the tension on the spring 17 or compensating for wear on the tire.

If desired, the chain sections 16 and 19 may be omitted and the ends of the spring 17 may be connected directly to the lugs 10. Similarly the springs 17 may be omitted and a chain or other device may connect the spaced lugs. In this event, one of the lugs 10 must be disengageable from its chains or other connections, and these connections attached after all the lugs are in place upon the tire.

In accordance with the patent statutes, I have described the principles of construction and operation of my tire lug, and while I have endeavored to set forth the best embodiment thereof, I desire to have it understood that obvious changes may be made within the scope of the following claims without departing from the spirit of my invention.

I claim:

1. A tire lug comprising a pair of side arms designed to extend over opposite sides of a tire and a connecting base portion, and a continuous concave inner surface on said arms and said base into which the tire may expand, the concavity of said inner surface being more pronounced adjacent the respective junctures of said arms and base.

2. A tire lug comprising a pair of side arms designed to extend over opposite sides of a tire and a connecting base portion, said arms and base portions being provided with an outwardly projecting rib forming an inwardly facing groove, said groove being deeper adjacent the respective junctures of said side arms and base.

3. The structure described in claim 2 in which the deeper sections of said groove are substantially triangular.

4. A tire lug comprising a pair of side arms designed to extend over opposite sides of a tire and a connecting base portion, and a concave inner surface on said arms and said base, into which the tire may expand, the regions of said lug adjacent the junctures of said side arms and said base portion being of a different width than the remainder of said side arms and base portion.

5. The structure described in claim 4 in which said different width regions are relatively narrow.

6. A tire lug comprising a pair of side arms designed to extend over opposite sides of a tire and a connecting base portion, and an outwardly projecting rib on said arms and base portion, the base of said rib being wider adjacent the junctures of said side arms and base portion.

References Cited in the file of this patent

UNITED STATES PATENTS

| Number | Name | Date |
|---|---|---|
| 1,045,533 | Eckart | Nov. 26, 1912 |
| 1,115,221 | Lyon | Oct. 27, 1914 |
| 1,147,182 | Ost | July 20, 1915 |
| 1,315,131 | Kaupp | Sept. 2, 1919 |
| 1,676,453 | MacGuire | July 10, 1928 |
| 1,942,337 | Kennedy | Jan. 2, 1934 |
| 2,174,345 | Worthing | Sept. 26, 1939 |
| 2,290,398 | Wellington | July 21, 1942 |
| 2,458,522 | MacKay | Jan. 11, 1949 |
| 2,466,918 | Summa | Apr. 12, 1949 |
| 2,527,939 | Krider | Oct. 31, 1950 |